United States Patent [19]

Terakawa et al.

[11] Patent Number: 5,128,395

[45] Date of Patent: Jul. 7, 1992

[54] RUBBER COMPOSITION FOR LAMINATED VIBRATIONPROOFING STRUCTURE

[75] Inventors: Katsumi Terakawa; Fumio Sekido, both of Akashi, Japan

[73] Assignee: Sumitomo Rubber Industries, Ltd., Hyogo, Japan

[21] Appl. No.: 777,911

[22] Filed: Oct. 17, 1991

[30] Foreign Application Priority Data

Oct. 19, 1990 [JP] Japan .................. 2-282418
Feb. 21, 1991 [JP] Japan .................. 3-27112

[51] Int. Cl.⁵ .......................................... C08L 217/00
[52] U.S. Cl. ................................. 524/274; 524/270; 524/496; 525/206
[58] Field of Search ............... 524/270, 274, 496; 525/206

[56] References Cited

U.S. PATENT DOCUMENTS

| | | | |
|---|---|---|---|
| 2,551,952 | 9/1948 | Kunkle et al. | 524/496 |
| 3,399,104 | 7/1964 | Ball et al. | 524/496 |
| 4,223,107 | 9/1980 | Li et al. | 525/206 |
| 4,252,171 | 2/1981 | Imai et al. | 524/270 |
| 4,518,733 | 5/1985 | Ishikawa et al. | 524/274 |
| 4,977,205 | 12/1990 | Bauer et al. | 524/496 |

Primary Examiner—Paul R. Michl
Assistant Examiner—Olga Asinovsky
Attorney, Agent, or Firm—Birch, Stewart, Kolasch & Birch

[57] ABSTRACT

Disclosed is a rubber composition having high damping capacity as well as other excellent performances, for example, dependence of elastic modulus on temperature, shear deformation, etc., which is suitable for the laminated vibrationproofing structure. The rubber composition contains carbon black for use in rubber having an iodine adsorption of 70 to 115 mg/g and DBP adsorption (method A) of 115 to 70 ml/g in an amount of 30 to 70% by weight based on 100 parts by weight of a base rubber. The rubber composition is characterized by further containing:

an aromatic petroleum resin having a softening point of 70° to 140° C. and a bromine value of 0 to 0.2; and cumarone-indene resin and/or rosin in the ratio which satisfies the relation:

$$8 \leq \frac{4}{3} A + B \leq 50 \qquad (I)$$

wherein A is a total amount of cumarone-indene resin and rosin formulated, B is an amount of an aromatic petroleum resin formulated and B is not 0.

9 Claims, 3 Drawing Sheets $$\text{Shear deformation (\%)} = \frac{h_1 - h_0}{h_0} \times 100$$

RUBBER COMPOSITION FOR LAMINATED VIBRATIONPROOFING STRUCTURE

FIELD OF THE INVENTION

The present invention relates to a rubber composition for a laminated vibrationproofing structure.

BACKGROUND OF THE INVENTION

Recently, laminated vibrationproofing structures have been widely used as an vibration isolator for constructive structures (e.g. building). These laminated vibrationproofing structures are introduced between the structures and the foundation to decrease transmission of earthquake vibration energy to the structures. Wide variety of laminated vibrationproofing structures have been proposed. Normally, they are structures wherein a rigid plate and a large damping rubber layer having viscoelastic property are alternatively laminated (see FIG. 1 hereinafter).

Hitherto, in order to enhance a damping capacity, there have been proposed a method comprising formulating a large amount of carbon black or a filler in the rubber, or a method comprising adding a polymer having a high glass transition point. However, in these methods, elongation of the resulting rubber composition is lowered, or dependence of elastic modulus on temperature becomes large which results in excessive elastic modulus at the low temperature range of about $-10°$ C.

In the case of an earthquake, the laminated vibrationproofing structure produces vibrationproofing and damping effect by causing shear deformation and the larger the amount of shear deformation becomes, the better. Those which cause shear deformation of not less than 50% are desired. Although the laminated vibrationproofing structure is used at a temperature between about 30° C. and $-10°$ C., it is important that the elastic modulus does not become too large on the low temperature side.

Further, the above damping effect is particularly effective for a rather strong earthquake which causes large deformation (e.g. shear deformation of not less than 5 %) in the laminated vibrationproofing structure. Accordingly, it is important that the laminated vibrationproofing structure has a large damping capacity at a large deformation range (e.g. not more than 5%). For that purpose, it is requested that Tan $\delta$ is large at the large deformation range.

OBJECTS OF THE INVENTION

One object of the present invention is to provide a rubber composition having a large damping capacity as well as other excellent performances, for example, dependence of elastic modulus on temperature, shear deformation, etc., which is suitable for the laminated vibrationproofing structure. That is, the present invention provides a large damping rubber composition satisfying the above requirements, said rubber composition having small dependence of elastic modulus on temperature and small permanent compression deformation as well as shear deformation of more than 550%, and having large Tan $\delta$ at a large deformation range (e.g. shear deformation of not less than 5%).

This object as well as other objects and advantages of the present invention will become apparent to those skilled in the art from the following description with reference to the accompanying drawings.

SUMMARY OF THE INVENTION

Figure 1:
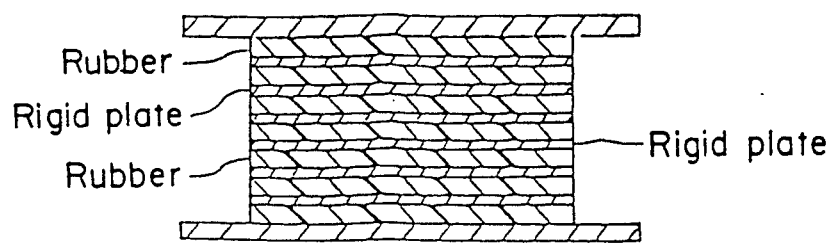
FIG. 1 is a schematic cross section illustrating one embodiment of a laminated vibrationproofing structure of the present invention.

According to the present invention, there is provided a rubber composition containing carbon black for use in rubber having an iodine adsorption of 70 to 115 mg/g and DBP adsorption (method A) of 115 to 70 ml/100 g in an amount of 30 to 70% by weight based on 100 parts by weight of a base rubber, said composition further containing:

an aromatic petroleum resin having a softening point of 70° to 140° C. and a bromine value of 0 to 0.2; and cumarone-indene resin and/or rosin in the ratio which satisfies the relation:

$$8 \leq \frac{4}{3} A + B \leq 50 \quad (I)$$

wherein A is a total amount of cumarone-indene resin and rosin formulated, B is an amount of the aromatic petroleum resin formulated and B is not 0.

DETAILED DESCRIPTION OF THE INVENTION

As the base rubber used in the present invention, for example, there are natural rubber, synthetic rubber and the like and they may be used alone or in combination thereof. As the synthetic rubber, polyisoprene rubber is preferred and the other rubbers (e.g. butadiene rubber, styrene-butadiene rubber, etc.) may also be added in an amount of about 20 parts by weight based on the total rubber.

The carbon black formulated in the rubber composition of the present invention has an iodine adsorption of 70 to 115 mg/g, preferably 80 to 110 mg/g and DBP adsorption (method A) of 115 to 70 ml/ 100 g, preferably 110 to 70 ml/100 g. The iodine adsorption and DBP adsorption (method A) are measured according to JIS K6211. When the iodine adsorption of the carbon black is less than 70 mg/g, the damping capacity is lowered. When the iodine adsorption is more than 115 mg/g, elongation of the rubber composition is lowered and, further, processing characteristics (e.g. kneading, calendering, extrusion, etc.) are deteriorated. When DBP adsorption of the carbon black is less than 70 ml/100 g, dispersion is deteriorated. When DBP adsorption exceeds 115 ml/100 g, breaking elongation is lowered.

The amount of the carbon black added is 30 to 70 parts by weight, preferably 40 to 65% parts by weight based on 100 parts by weight of the rubber. When the amount of the carbon black is less than 30 parts by weight, the damping capacity is lowered and, when the amount exceeds 70 parts by weight, the breaking elongation is lowered.

In the present invention, the aromatic petroleum resin formulated in the rubber is an aromatic petroleum resin having no double bond other than an aromatic ring wherein the aromatic ring and methylene group are alternatively bonded. The softening point is 70° to 140° C., preferably 80° to 130° C. The resin having the softening point of less than 70° C. has low damping capacity, and the resin having the softening point of more than 140° C. is hardly dissolved during kneading and deterioration of dispersion is liable to occur. In addition, the bromine value is 0 to 2.0, preferably 0. When it exceeds 2.0, the elongation and shear deformation are lowered.

The amount of the aromatic petroleum resin formulated is preferably 5 to 50% by weight based on 100 parts by weight of the rubber. When the amount is less than 5 parts by weight, there are disadvantages that the damping capacity is deteriorated and shear deformation is lowered. When the amount exceeds 50 parts by weight, kneading property and calendering property are deteriorated in the case of processing the rubber.

Figure 4:
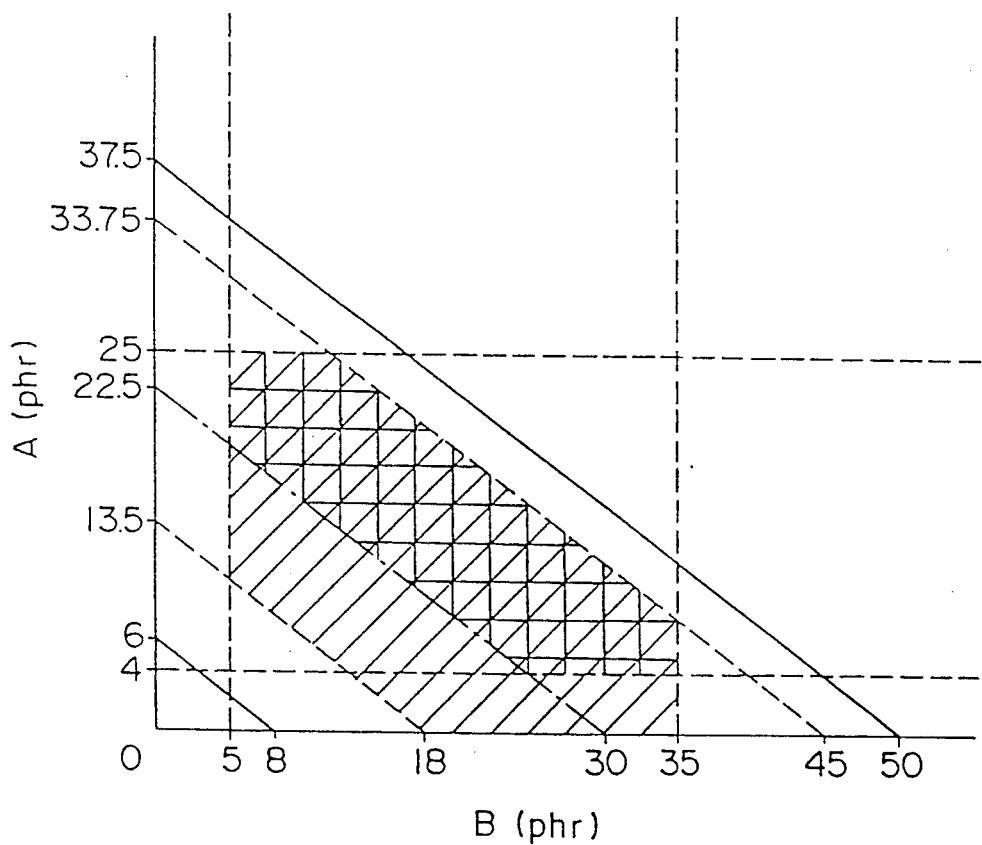
FIG. 4 is a graph illustrating the domain of the relation (I) hereinafter which indicates the amount of cumarone-indene resin, rosin and aromatic petroleum resin formulated.

In the present invention, in order to enlarge Tan δ at the large deformation range, it is preferred that cumarone-indene and/or rosin are further formulated. Further, cumarone-indene resin is more preferably in view of Tan δ and processing characteristics. It is preferred that the ratio of cumarone-indene resin and rosin satisfies the relation:

$$8 \leq \frac{4}{3} A + B \leq 50 \qquad (I)$$

wherein A is a total amount of cumarone-indene resin and rosin formulated, B is an amount of an aromatic petroleum resin formulated and B is not 0. When it is less than 8, sufficient damping capacity can not be obtained. When it exceeds 50, dependence of elastic modulus on temperature and permanent compression deformation are extremely deteriorated and, at the same time, adhesion is extremely increased which results in extremely deterioration of processing characteristics. In the above relation (I), it is preferred that A is 0 to 25 and B is 5 to 35. In addition, A exceeds 25, shear deformation is decreased. The domain represented by the relation (I) is shown in FIG. 4. Further, the domain which indicates preferred A and B is shown by an oblique line in the figure. In the case that Tan δ of not less than 0.25 is required, the domain shown by a cross oblique line is preferred.

Vulcanizing agent (e.g. sulfur, etc.), vulcanization accelerator, vulcanization aid, anti-aging agent, filler, softening agent, tackifier and the like may be optionally added to the rubber composition of the present invention.

The rubber composition of the present invention is vulcanized at 150° C. after kneading of the above components. The shear deformation of the rubber thus obtained exceeds 550%.

Various physical properties of the rubber composition of the present invention are measured by the following method.

Figure 2:
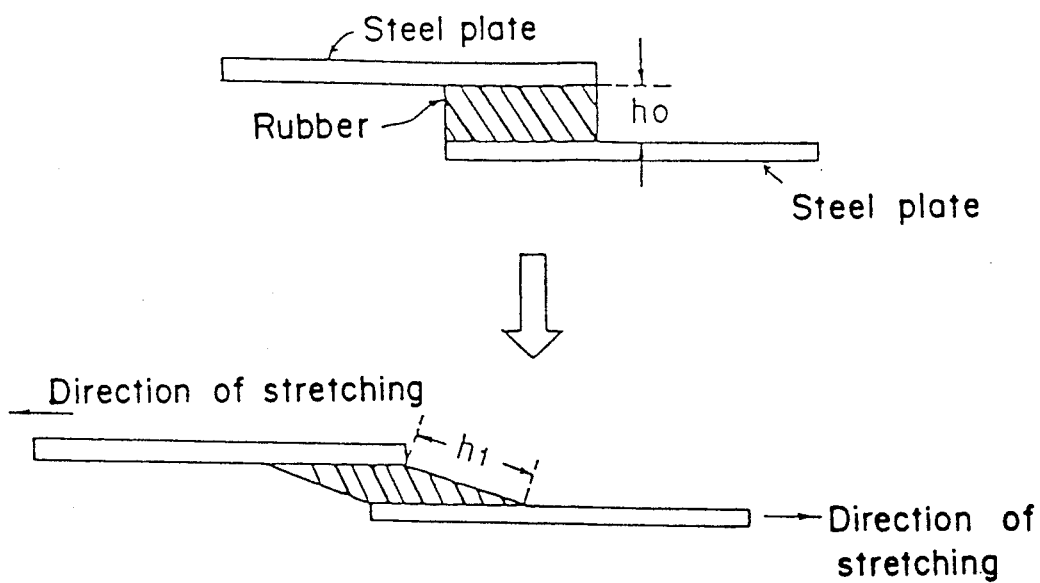
FIG. 2 is a schematic diagram illustrating the measurement of shear deformation.

Tensile strength (kgf/cm$^2$), elongation (%) and permanent compression deformation (%) were determined according to JIS K6301. Regarding shear deformation, as shown in FIG. 2, a specimen of 5 mm in thickness was bonded between steel plates by vulcanizing and then the upper and bottom plates were stretched in the opposite horizontal direction to measure breaking elongation. Dynamic complex shear elastic modulus (G*) and Tan δ were measured under the conditions of a frequency of 0.5 Hz, a temperature of 30° C. and −10° C. and a shear deformation of ±50%.

The following Examples and Comparative Examples further illustrates the present invention in detail but are not to be construed to limit the scope thereof.

Examples A to E, K to Q, R, T and U and Comparative Examples F to J, S and V

By using carbon black and an aromatic petroleum resin as shown in Tables 1 and 2, a rubber composition as shown in Tables 3 to 6 was kneaded, respectively, and then the composition was subjected to press vulcanization at 150° C. for 35 minutes to measure various physical properties of the resulting vulcanized rubber. The results are shown in Tables 3 to 6, respectively.

Target value for design of formulation is as follows.
Tan δ (30° C.): not less than 0.2
Dependence of shear elastic modulus on temperature: $G^*(-10° C.)/G^*(30° C.)$: not more than 2.5
Shear deformation: not less than 550%

TABLE 1

|  | Iodine adsorption (mg/g) | DBP adsorption (method A) (ml/100 g) |
|---|---|---|
| HAF | 80 | 101 |
| LS-ISAF | 110 | 80 |
| GPF | 26 | 88 |
| N339 | 90 | 121 |

TABLE 2

|  | Softening point (°C.) | Bromine value (g Br/100 g) |
|---|---|---|
| Oligotec 1400 | 120 | 0.3 |
| Oligotec 1300 | 95 | 0.3 |
| Neopolymer 80 | 83 | 25 |

Note:
Bromine value was measured according to JIS 2606.
Softening point was measured by ring and ball method.

TABLE 3

|  | Example A | Example B | Example C | Example D | Example E |
|---|---|---|---|---|---|
| Components |  |  |  |  |  |
| Natural rubber | 100 | 100 | 70 | 70 | 50 |
| Califrex 309[1)] | — | — | 30 | 30 | 50 |
| HAF | 50 | — | 50 | 50 | 50 |
| LS-ISAF | — | 50 | — | — | — |
| GPF | — | — | — | — | — |
| Oligotec 1400 | 20 | 20 | 20 | — | 20 |
| Oligotec 1300 | — | — | — | 20 | — |
| Rosin | 5 | 5 | 5 | 5 | 5 |
| Aromatic oil[2)] | 10 | 10 | 10 | 10 | 10 |
| Anti-aging agent | 3 | 3 | 3 | 3 | 3 |
| Zinc oxide | 5 | 5 | 5 | 5 | 5 |
| Stearic acid | 1 | 1 | 1 | 1 | 1 |
| Sulfur | 0.8 | 0.8 | 0.8 | 0.8 | 0.8 |
| Vulcanization accelerator[3)] | 1.9 | 1.9 | 1.9 | 1.9 | 1.9 |
| Vulcanization accelerator[4)] | 0.8 | 0.8 | 0.8 | 0.8 | 0.8 |
| Physical properties |  |  |  |  |  |
| Tensile strength (kgf/cm$^2$) | 204 | 210 | 198 | 190 | 190 |
| Elongation (%) | 720 | 740 | 780 | 750 | 790 |
| Permanent | 17 | 18 | 16 | 14 | 14 |

TABLE 3-continued

|  | Example A | Example B | Example C | Example D | Example E |
|---|---|---|---|---|---|
| compression deformation (%) |  |  |  |  |  |
| Shear deformation (%) | 620 | 640 | 680 | 640 | 680 |
| $G^*$ (kgf/cm$^2$) at 30° C. | 7.0 | 7.4 | 7.1 | 6.2 | 7 |
| Tan δ at 30° C. | 0.23 | 0.25 | 0.24 | 0.22 | 0.24 |
| $G^*$ (kgf/cm$^2$) at −10° C. | 10.3 | 11.3 | 10.4 | 9.1 | 10.3 |
| Tan δ at −10° C. | 0.36 | 0.38 | 0.37 | 0.36 | 0.37 |
| $G^*$ (−10° C./30° C.) | 1.48 | 1.5 | 1.47 | 1.47 | 1.47 |

Note:
[1] polyisoprene rubber manufactured by Shell Chemical Co.
[2] Mobilsol 30 manufactured by Mobil Oil Co.
[3] oxydiethylene 2 benzothiazole sulfenamide
[4] tetrabutylthiuram disulfide

TABLE 4

|  | Com. Example F | Com. Example G | Com. Example H | Com. Example I | Com. Example J |
|---|---|---|---|---|---|
| Components |  |  |  |  |  |
| Natural rubber | 100 | 100 | 100 | 100 | 100 |
| HAF | — | — | 20 | 80 | — |
| GPF | 50 | — | 30 | — | 50 |
| N339 | — | 50 | — | — | — |
| Oligotec 1400 | 20 | 20 | — | 20 | — |
| Rosin resin | 5 | 5 | 5 | 5 | 5 |
| Neopolymer 80 | — | — | — | — | 20 |
| Aromatic oil[2] | 10 | 10 | 10 | 10 | 10 |
| Anti-aging agent | 3 | 3 | 3 | 3 | 3 |
| Zinc oxide | 5 | 5 | 5 | 5 | 5 |
| Stearic acid | 1 | 1 | 1 | 1 | 1 |
| Sulfur | 0.8 | 0.8 | 0.8 | 0.8 | 0.8 |
| Vulcanization accelerator[3] | 1.9 | 1.9 | 1.9 | 1.9 | 1.9 |
| Vulcanization accelerator[4] | 0.8 | 0.8 | 0.8 | 0.8 | 0.8 |
| Physical properties |  |  |  |  |  |
| Tensile strength (kgf/cm$^2$) | 208 | 230 | 196 | 170 | 220 |
| Elongation (%) | 720 | 500 | 760 | 520 | 630 |
| Permanent compression deformation (%) | 13 | — | 13 | — | 15 |
| Shear deformation (%) | 590 | 450 | 590 | 500 | 520 |
| $G^*$ (kgf/cm$^2$) at 30° C. | 5.9 | — | 6.3 | — | 7.6 |
| Tan δ at 30° C. | 0.13 | — | 0.16 | — | 0.24 |
| $G^*$ (kgf/cm$^2$) at −10° C. | 7.8 | — | — | — | 11 |
| Tan δ at −10° C. | 0.23 | — | — | — | 1.45 |
| $G^*$ (−10° C./30° C.) | 1.32 | — | — | — | 1.45 |

Note:
[2] Mobilsol by Mobil Oil Co.
[3] oxydiethylene 2 benzothiazole sulfenamide
[4] tetrabutylthiuram disulfide

TABLE 5

|  | Example K | Example L | Example M | Example N |
|---|---|---|---|---|
| Components |  |  |  |  |
| Natural rubber | 100 | 100 | 100 | 100 |
| HAF | 55 | — | — | — |
| LS-ISAF | — | 60 | 50 | 53 |
| Oligotec 1400 | 22 | 25 | 20 | 24 |
| Escuron | — | — | — | 10 |
| Hirosin | 10 | 10 | 10 | — |
| Softening agent | 15 | 18 | 6 | 4 |
| Anti-aging agent | 3 | 3 | 3 | 3 |
| Zinc oxide | 5 | 5 | 5 | 5 |
| Stearic acid | 1 | 1 | 1 | 1 |
| Sulfur | 0.8 | 0.8 | 0.8 | 0.8 |
| Vulcanization accelerator | 2.8 | 2.8 | 2.8 | 2.8 |
| Retarder | 0.3 | 0.3 | 0.3 | 0.3 |
| Physical properties |  |  |  |  |
| Tan δ at 30° C. | 0.288 | 0.289 | 0.280 | 0.312 |
| $G^*$ (kgf/cm$^2$) at 30° C. | 5.80 | 5.76 | 6.03 | 6.98 |
| $G^*$ (−10° C./30° C.) | 1.71 | 1.80 | 1.59 | 1.68 |
| Shear deformation (%) | 593 | 610 | 622 | 630 |
| Processing characteristics | good | good | good | good |

|  | Example O | Example P | Example Q |
|---|---|---|---|
| Natural rubber | 100 | 100 | 100 |
| HAF | — | — | — |
| LS-ISAF | 60 | 48 | 50 |
| Oligotec 1400 | 30 | 20 | 29 |
| Escuron | 12 | 14 | 8 |
| Hirosin | — | — | — |
| Softening agent | 4 | — | — |
| Anti-aging agent | 3 | 3 | 3 |
| Zinc oxide | 5 | 5 | 5 |
| Stearic acid | 1 | 1 | 1 |
| Sulfur | 0.8 | 0.8 | 0.8 |
| Vulcanization accelerator |  |  |  |
| Retarder | 0.3 | 0.3 | 0.3 |
| Physical properties |  |  |  |
| Tan δ at 30° C. | 0.380 | 0.298 | 0.304 |
| $G^*$ (kgf/cm$^2$) at 30° C. | 6.85 | 7.66 | 6.91 |
| $G^*$ (−10° C./30° C.) | 1.68 | 1.62 | 1.65 |
| Shear deformation (%) | 625 | 595 | 635 |
| Processing characteristics | slightly inferior | good | good |

TABLE 6

|  | Example R | Com. Example S | Example T | Example U | Com. Example V |
|---|---|---|---|---|---|
| Components |  |  |  |  |  |
| Natural rubber | 100 | 100 | 100 | 100 | 100 |
| LS-ISAF | 50 | 53 | 50 | 50 | 50 |
| Oligotec 1400 | 8 | 40 | 22 | 10 | 3 |
| Escuron | 5 | — | — | 20 | 2 |
| Hirosin | — | 10 | — | — | — |
| Softening agent | 20 | — | 15 | 10 | 24 |
| Anti-aging agent | 3 | 3 | 3 | 3 | 3 |
| Zinc oxide | 5 | 5 | 5 | 5 | 5 |

TABLE 6-continued

| Stearic acid | 1 | 1 | 1 | 1 | 1 |
|---|---|---|---|---|---|
| Sulfur | 0.8 | 0.8 | 0.8 | 0.8 | 0.8 |
| Vulcanization accelerator | 2.8 | 2.8 | 2.8 | 2.8 | 2.8 |
| Retarder | 0.3 | 0.3 | 0.3 | 0.3 | 0.3 |
| Physical properties | | | | | |
| Tan δ at 30° C. | 0.195 | 0.371 | 0.211 | 0.295 | 0.158 |
| G* (kgf/cm$^2$) at 30° C. | 7.1 | 6.7 | 6.6 | 7.8 | 7.3 |
| G* (−10° C./30° C.) | — | — | — | — | — |
| Shear deformation (%) | 580 | 700 | 620 | 550 | — |
| Processing characteristics | excellent | inferior | excellent | good | excellent |

The rubber compositions of Examples A and B wherein carbon black and the aromatic petroleum resin are used in the amount within the range of the claim of the present invention show large Tan δ and large shear deformation. They are superior in shear deformation in comparison with Comparative Examples G and J and are superior in Tan δ in comparison with Comparative Example F.

In addition, as shown in Comparative Examples H and I, even if carbon black is used, Tan δ is too small when the amount is small (as shown in Comparative Example H). When the amount is too large as shown in Comparative Example I, shear deformation is lowered.

Further, the rubber compositions of Examples C, D and E are those wherein the natural rubber and polyisoprene rubber are blended and carbon black and the aromatic petroleum resin are used in the amount within the range of the claim of the present invention. Both rubber compositions of Examples C, D and E show large Tan δ and large shear elongation.

The rubber compositions of Examples K to N, P, Q, T and U satisfy the amount as shown in the oblique line domain in FIG. 4 and show good Tan δ, shear deformation and processing characteristics. Although the rubber compositions of Examples O and R satisfy the above relation (I), the amount are not included within the oblique line domain. The rubber composition of Example O shows large Tan δ and large shear deformation but it is inferior in processing characteristics. The rubber composition of Example R shows small Tan δ.

The rubber composition of Comparative Example V shows small Tan δ and the rubber composition of Comparative Example shows inferior processing characteristics.

Test for the determination of a relation between Tan δ and shear deformation using various resins for use in rubber Experiment Examples 1 to 8

Figure 3:
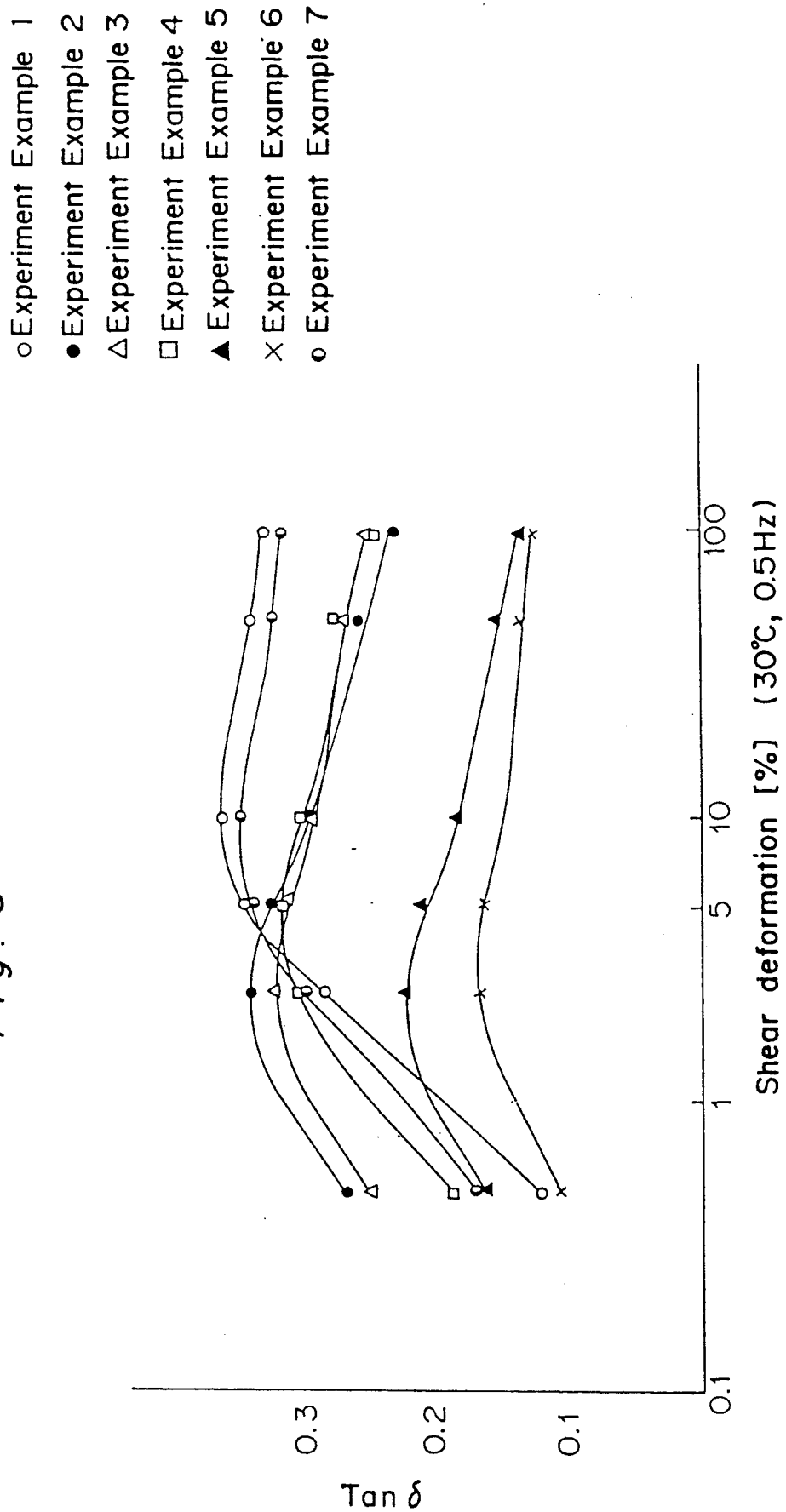
FIG. 3 is a graph illustrating a relation between Tan $\delta$ and shear deformation in case of using various resins for use in rubber.

40 Parts by weight of various resins for use in rubber were formulated in 100 parts by weight of a natural rubber and dependence of dynamic viscoelasticity on deformation of the resulting vulcanized product was measured. The test results are shown in Table 3 and FIG. 3.

TABLE 7

| | Exp. Example 1 | Exp. Example 2 | Exp. Example 3 | Exp. Example 4 |
|---|---|---|---|---|
| Components | | | | |
| Natural rubber | 100 | 100 | 100 | 100 |
| HAF | 50 | 50 | 50 | 50 |
| Cumarone-indene resin | 40 | — | — | — |
| Alkyl phenol resin | — | 40 | — | — |
| DCPD resin | — | — | 40 | — |
| Aromatic resin | — | — | — | 40 |
| Hydrogenated terpene resin | — | — | — | — |
| Rosin | — | — | — | — |
| Powdered talc | — | — | — | — |
| Softening agent | — | — | — | — |
| Sulfur | 2 | 2 | 2 | 2 |
| Vulcanization accelerator | 1 | 1 | 1 | 1 |
| Shear deformation (%) | Tan δ at 30° C. | | | |
| 0.5 | 0.120 | 0.265 | 0.248 | 0.184 |
| 2.5 | 0.281 | 0.336 | 0.318 | 0.300 |
| 5.0 | 0.340 | 0.320 | 0.306 | 0.312 |
| 10 | 0.356 | 0.286 | 0.284 | 0.297 |
| 50 | 0.334 | 0.255 | 0.265 | 0.272 |
| 100 | 0.325 | 0.230 | 0.249 | 0.243 |

| | Exp. Example 5 | Exp. Example 6 | Exp. Example 7 | Exp. Example 8 |
|---|---|---|---|---|
| Components | | | | |
| Natural rubber | 100 | 100 | 100 | 100 |
| HAF | 50 | 50 | 50 | 50 |
| Cumarone-indene resin | — | — | — | — |
| Alkyl phenol resin | — | — | — | — |
| DCPD resin | — | — | — | — |
| Aromatic resin | — | — | — | — |
| Hydrogenated terpene resin | 40 | — | — | — |
| Rosin | — | — | 40 | — |
| Powdered talc | — | — | — | 150 |
| Softening agent | — | — | — | 20 |
| Sulfur | 2 | 2 | 2 | 2 |
| Vulcanization accelerator | 1 | 1 | 1 | 1 |
| Shear deformation (%) | Tan δ at 30° C. | | | |
| 0.5 | 0.163 | 0.104 | 0.168 | 0.240 |
| 2.5 | 0.220 | 0.164 | 0.295 | 0.273 |
| 5.0 | 0.208 | 0.159 | 0.334 | 0.216 |
| 10 | 0.181 | 0.153 | 0.343 | 0.156 |
| 50 | 0.151 | 0.135 | 0.320 | 0.128 |
| 100 | 0.133 | 0.126 | 0.311 | 0.123 |

In Experiment Examples 1 and 7, cumarone-indene resin and rosin were formulated in an amount of 40 parts by weight (phr) based on 100 phr of the natural rubber, respectively. Increase of Tan δ at the large deformation range is remarkable in comparison with Experiment Example 6 wherein no resin is added. On the other hand, in Experiment Examples 2 and 3, alkyl phenol resin (*1) and DCPD resin (*2) were formulated, respectively. Regarding these resins, increase of Tan δ at the micro deformation range is remarkable. Further, in Experiment Example 8, powdered talc was formulated in an amount of 150 phr. Tan δ at the micro deformation range is large, while Tan δ at the large deformation range is small. In addition, Experiment Example 4 wherein an aromatic resin (*3) is formulated has medium properties in comparison with the above Experiment Examples. Namely, cumarone-indene resin and rosin are suitable as an agent to be formulated in the laminated vibrationdamping structure.

(Note) *1: PR 19900 (manufactured by Sumitomo Durez K.K.); *2: Quinton 1325 (manufactured by Nihon Zeon K.K.)

What is claimed is:

1. In a rubber composition containing carbon black for use in rubber having an iodine adsorption of 70 to 115 mg/g and DBP adsorption (method A) of 115 to 70 ml/g in an amount of 30 to 70% by weight based on 100 parts by weight of a base rubber, said rubber composition further containing:

an aromatic petroleum resin having a softening point of 70 to 140° C. and a bromine value of 0 to 0.2: and cumarone-indene resin and/or rosin in the ratio which satisfies the relation:

$$8 \leq \frac{4}{3} A + B \leq 50 \qquad (I)$$

wherein A is a total amount of cumarone-indene resin and rosin formulated, B is an amount of the aromatic petroleum resin formulated and B is not 0.

2. The rubber composition according to claim 1, wherein said base rubber is natural rubber.

3. The rubber composition according to claim 1, wherein said base rubber is synthetic rubber.

4. The rubber composition according to claim 3, wherein said synthetic rubber is polyisoprene rubber.

5. The rubber composition according to claim 1, which further contains an additive selected from a vulcanizing agent, vulcanization accelerator, a vulcanization aid, an anti-aging agent, a filler, a softening agent, a tackifier or a mixture thereof.

6. The rubber composition according to claim 1, which further contains up to about 20 parts of butadiene rubber, styrene-butadiene rubber or a mixture thereof.

7. The rubber composition according to claim 1, wherein the carbon black has an iodine adsorption of 80 to 110 mg/g and DBP adsorption (method A) of 110 to 70 ml/100g.

8. The rubber composition according to claim 1, wherein the amount of carbon black contained in said composition is 40 to 65%.

9. The rubber composition according to claim 1, wherein the aromatic petroleum has a softening point of 80 to 130° C. and a bromine value of 0.

* * * * *